United States Patent
Jones et al.

(10) Patent No.: US 9,951,833 B2
(45) Date of Patent: Apr. 24, 2018

(54) BRAKE ASSEMBLY HAVING A BRAKE WING

(71) Applicant: ArvinMeritor Technology, LLC, Troy, MI (US)

(72) Inventors: Lebree Jones, Troy, MI (US); Peter Moss, Detroit, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 404 days.

(21) Appl. No.: 13/783,455

(22) Filed: Mar. 4, 2013

(65) Prior Publication Data
US 2014/0246280 A1 Sep. 4, 2014

(51) Int. Cl.
*F16D 51/00* (2006.01)
*F16D 65/02* (2006.01)

(52) U.S. Cl.
CPC ........ *F16D 65/02* (2013.01); *F16D 2051/003* (2013.01)

(58) Field of Classification Search
CPC ........ F16D 65/02; F16D 65/09; F16D 65/095; F16D 2065/13
USPC ................................................. 188/325, 329
See application file for complete search history.

(56) References Cited

U.S. PATENT DOCUMENTS

| | | | | |
|---|---|---|---|---|
| 2,619,202 A * | 11/1952 | Buckendale | .................. | 188/362 |
| 2,755,890 A * | 7/1956 | Scheel | ........................... | 188/355 |
| 3,076,531 A * | 2/1963 | Fisher et al. | .............. | 188/205 R |
| 3,744,381 A * | 7/1973 | Travaglio | ....................... | 92/161 |
| 4,200,174 A * | 4/1980 | Borugian et al. | ............. | 188/329 |
| D260,758 S * | 9/1981 | Borugian | ..................... | D12/180 |
| 4,337,851 A * | 7/1982 | Pringle | ......................... | 188/330 |
| 4,552,254 A * | 11/1985 | Baltare | ......................... | 188/328 |
| 4,754,857 A * | 7/1988 | Urban | ....................... | 188/205 R |
| 4,813,516 A * | 3/1989 | Urban | ........................ | 188/79.55 |
| 4,907,678 A * | 3/1990 | Urban | ............................. | 188/78 |
| 5,193,653 A * | 3/1993 | Carr | .......................... | 188/79.55 |
| 5,325,945 A * | 7/1994 | Walker | ........................... | 188/341 |
| D376,751 S * | 12/1996 | Hanson et al. | ................ | D8/354 |
| 5,649,612 A | 7/1997 | Walker et al. | | |
| 5,887,687 A * | 3/1999 | Williams | ...................... | 188/330 |
| 6,116,626 A * | 9/2000 | Cherry et al. | ......... | 280/124.135 |
| 6,240,806 B1 * | 6/2001 | Morris et al. | ................... | 74/567 |
| 7,055,662 B1 * | 6/2006 | Jones et al. | .................... | 188/341 |
| 7,537,224 B2 * | 5/2009 | Morris et al. | .......... | 280/124.116 |
| 7,708,124 B1 * | 5/2010 | Rackers et al. | ............ | 188/250 F |
| 7,975,812 B2 * | 7/2011 | Gonska et al. | ........... | 188/205 R |
| 8,127,903 B2 * | 3/2012 | Scheckelhoff et al. | ....... | 188/329 |
| 8,387,926 B2 * | 3/2013 | Runels et al. | .................. | 248/62 |
| 2007/0140782 A1 | 6/2007 | Morris et al. | | |

FOREIGN PATENT DOCUMENTS

CN  101903676 A  12/2010

OTHER PUBLICATIONS

Chinese Patent Office, Office Action for the corresponding Chinese Patent Application No. 201410037458.4 dated Dec. 4, 2015.

* cited by examiner

*Primary Examiner* — Robert A. Siconolfi
*Assistant Examiner* — James K Hsiao
(74) *Attorney, Agent, or Firm* — Brooks Kushman P.C.

(57) ABSTRACT

A brake assembly for a vehicle. The brake assembly may have a brake wing that includes a panel, a first flange, and a second flange. The first and second flanges may extend from the panel such that the second flange extends from the first flange.

20 Claims, 3 Drawing Sheets

BRAKE ASSEMBLY HAVING A BRAKE WING

TECHNICAL FIELD

The present application relates to a brake assembly having a brake wing.

BACKGROUND

A bracket for a vehicle brake assembly is disclosed in U.S. Pat. No. 5,649,612.

SUMMARY

In at least one embodiment, a brake assembly is provided. The brake assembly may include a camshaft housing that may be configured to receive a camshaft for actuating a brake pad assembly and a brake wing. The brake wing may include a panel, a first flange, and a second flange. The panel may have a first surface, a second surface, and a camshaft housing hole that may extend from the first surface to the second surface. The camshaft housing hole may receive the camshaft housing. The first flange may extend from the panel. The second flange may extend from the panel and the first flange. The first and second flanges may extend in a direction that faces away from the second surface.

In at least one embodiment, a brake assembly is provided. The brake assembly may include a camshaft housing that may be configured to receive a camshaft for actuating a brake pad assembly and a brake wing. The brake wing may include a panel, a first flange, a second flange, and a third flange. The panel may have a first surface, a second surface, and a camshaft housing hole that may be configured to receive the camshaft housing and the camshaft. The first flange may extend from the panel and may be configured to support an actuator for actuating the camshaft. The second flange may extend from the panel and the first flange. The third flange may extend from the panel and the second flange. The first, second, and third flanges may extend substantially perpendicular to the panel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
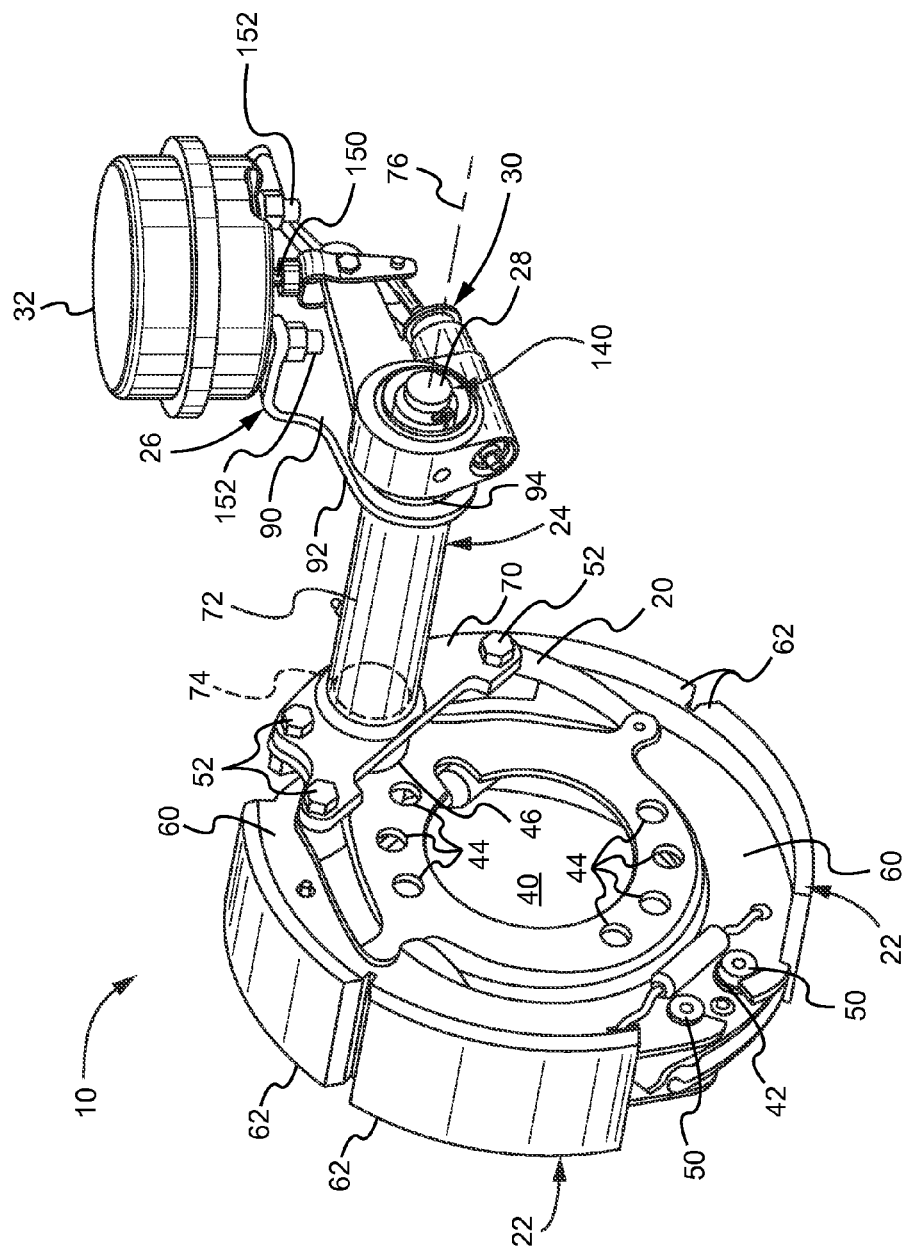
FIG. 1 is a perspective view of an exemplary brake assembly having a brake wing.

Referring to FIG. 1, an exemplary brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In addition, the brake assembly 10 may be provided on a trailer that may be coupled to or provided with a motor vehicle.

The brake assembly 10 may be a friction brake that may be configured to slow or inhibit rotation of at least one associated wheel assembly. In FIG. 1, the brake assembly 10 is depicted as a drum brake. In a drum brake configuration, a brake drum may extend continuously around brake pad assemblies that may be configured to engage the brake drum to slow rotation of a wheel assembly. The brake drum may be disposed between a wheel assembly and a wheel hub assembly that may rotatably support the wheel assembly. In at least one embodiment, the brake assembly 10 may include a spider 20, at least one brake pad assembly 22, a camshaft housing 24, a brake wing 26, a camshaft 28, a slack adjuster 30, and an actuator 32.

The spider 20 may support various components of the brake assembly 10. In addition, the spider 20 may facilitate mounting of the brake assembly 10 to the vehicle. For example, the spider 20 may be fixedly disposed on or with respect to an axle assembly or steering knuckle. In at least one embodiment, the spider 20 may include a hole 40 through which an axle and/or a spindle may extend. For example, a spindle may extend through the hole 40 and may support one or more wheel bearings that support and facilitate rotation of a wheel assembly. The spider 20 may also include at least one anchor pin hole 42, at least one spider mounting hole 44, and a camshaft opening 46.

An anchor pin hole 42 that may receive an anchor pin 50 that facilitates mounting and operation of a brake pad assembly 22 will be discussed in more detail below. In the embodiment shown, two anchor pin holes 42 are provided that are generally disposed on an opposite side of the spider 20 from the camshaft opening 46. Each anchor pin hole 42 may receive a different anchor pin 50, which in turn may support different brake pad assemblies 22.

A spider mounting hole 44 may facilitate mounting of the spider 20 to the vehicle. In FIG. 1, a plurality of spider mounting holes 44 are arranged around the hole 40. Each spider mounting hole 44 may receive a fastener, such as a bolt, that may extend through the spider mounting hole 44 and couple the spider 20 to an axle assembly or steering knuckle.

The camshaft opening 46 may receive the camshaft 28. More specifically, the camshaft 28 may extend through the camshaft opening 46 to engage one or more brake pad assemblies 22.

The brake pad assembly 22 may include a brake shoe 60 and a friction material 62. The brake shoe 60 may be a structural member of a brake pad assembly 22. The brake shoe 60 may be pivotally mounted to the spider 20 at a first end via the anchor pin 50. More specifically, the anchor pin 50 may be fixedly positioned with respect to the spider 20 and the brake shoe 60 may pivot about an outer surface or circumference of the anchor pin 50 when the brake pad assembly 22 is actuated. An opposite end of the brake shoe 60 may have a cam roller that may be configured to engage the camshaft 28.

The friction material 62, which may also be called a brake lining, may be disposed on an outer surface of the brake shoe 60 and may face toward the brake drum. The friction material 62 may engage the brake drum during vehicle braking and may be spaced apart from the brake drum when the friction braking is not being applied.

The camshaft housing 24 may facilitate mounting of the brake wing 26 to the spider 20. The camshaft housing 24 may include a bracket 70 and a tube portion 72.

The bracket 70 may be disposed proximate or may engage the spider 20. The bracket 70 may include at least one mounting hole that may be aligned with a corresponding mounting hole on the spider 20 and that may receive a fastener 52 that couples the bracket 70 to the spider 20. The bracket 70 may also have a hole 74 through which the camshaft 28 and tube portion 72 may extend. The bracket 70 may be fixedly mounted to the tube portion 72 any suitable manner, such as by welding.

The tube portion 72 may extend along an axis 76 and may have a through hole through which the camshaft 28 may extend. The tube portion 72 may be coupled to the bracket 70 at or near a first end and may be coupled to the brake wing 26 at or near a second end that may be disposed opposite the first end.

Figure 2:
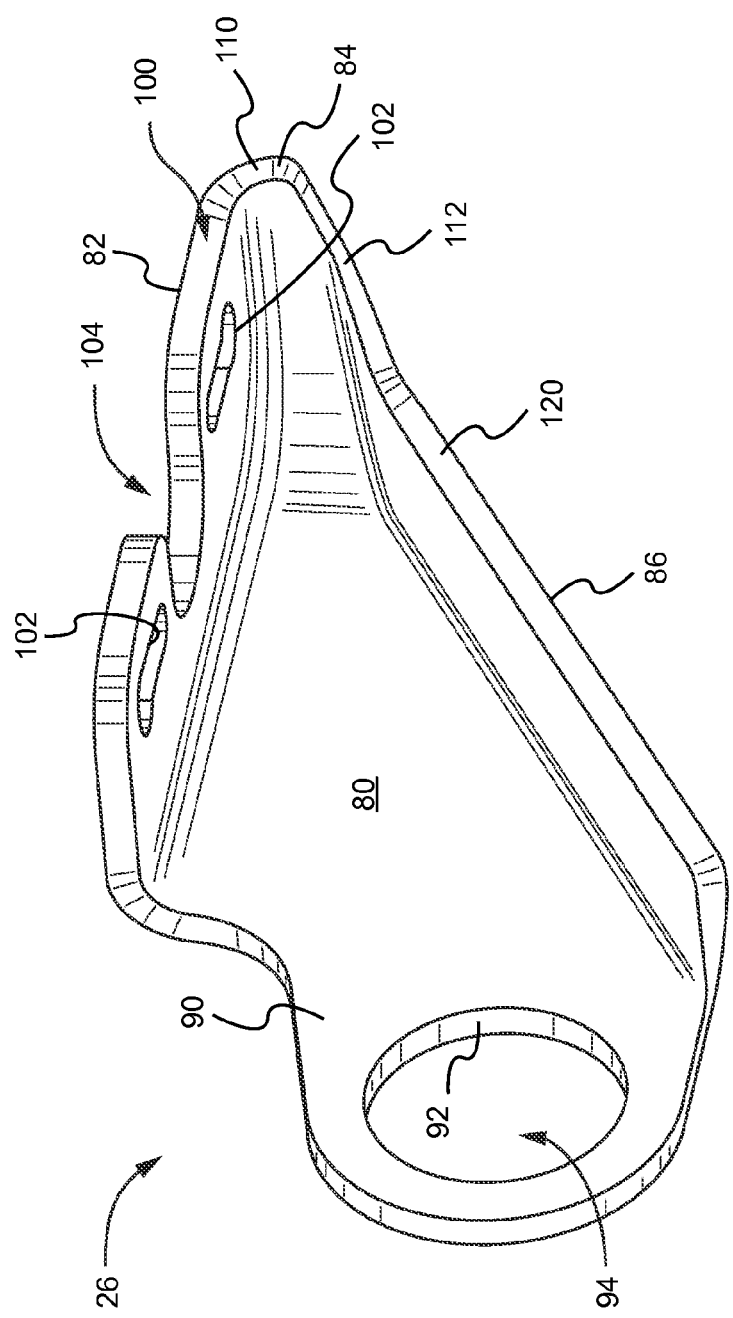
FIG. 2 is a perspective view of the brake wing of FIG. 1.

The brake wing 26 may be coupled to the camshaft housing 24 and may support the actuator 32. The brake wing 26 may be configured as a unitary component having a one piece construction. A first embodiment of a brake wing 26 is shown in FIG. 2. The brake wing 26 may include a panel 80, a first flange 82, a second flange 84, and a third flange 86.

The panel 80 may include a first surface 90 and a second surface 92. The first surface 90 may face toward the slack adjuster 30. The second surface 92 may be disposed opposite the first surface 90 and may face toward the spider 20. A camshaft housing hole 94 may be provided in the panel 80. The camshaft housing hole 94 may be a through hole that extends from the first surface 90 to the second surface 92. The camshaft housing hole 94 may be disposed proximate and may engage the tube portion 72 of the camshaft housing 24.

The first flange 82 may extend from the panel 80. For example, the first flange 82 may extend from an end, edge, or perimeter of the panel 80 and may extend from the first surface 90 in a direction that extends away from the spider 20, or that faces away from or is disposed opposite the second surface 92. As such, the first flange 82 may terminate at a first flange end surface 100 that may be spaced apart from the panel 80. In at least one embodiment, the first flange 82 may extend substantially perpendicular to the panel 80. The first flange 82 may be configured to support the actuator 32. For instance, the first flange 82 may include one or more mounting holes 102 and an actuator shaft opening 104.

The second flange 84 may extend from the panel 80 and from the first flange 82. In at least one embodiment, the second flange 84 may extend from a different end or edge of the panel 80 than the first flange 82. In addition, the second flange 84 may extend from the first surface 90 in the same direction as the first flange 82, or in a direction that extends away from the second surface 92. In at least one embodiment, the second flange 84 may include a second flange end surface 110 and a second flange ramp surface 112. The second flange end surface 110 may extend from the first flange end surface 100 to the second flange ramp surface 112. The second flange ramp surface 112 may extend from the second flange end surface 110 and generally toward the first surface 90 to the third flange 86. The second flange 84 may be disposed substantially perpendicular to the panel 80 and the first flange 82. As such, the second flange 84 may help support and inhibit deformation or deflection of the panel 80 and/or first flange 82, such as when the actuator 32 moves to actuate the camshaft 28.

The third flange 86 may extend from the panel 80 and from the second flange 84. As such, the first flange 82 and the third flange 86 may extend from opposite ends of the second flange 84. In at least one embodiment, the third flange 86 may extend from a different edge of the panel 80 than the first flange 82 and the second flange 84. In addition, the third flange 86 may extend from the first surface 90 in the same direction as the first flange 82 and the second flange 84, or in a direction that extends away from the second surface 92. In at least one embodiment, the third flange may have a third flange end surface 120 that may be disposed closer to the first surface 90 than the first flange end surface 100 and/or the second flange end surface 110. As such, the first and second flanges 82, 84 may extend further from the first surface 90 than the third flange 86. The third flange 86 may be disposed substantially perpendicular to the panel 80 in one or more embodiments. As such, the third flange 86 may help support and inhibit deformation or deflection of the panel 80 and/or second flange 84. In addition, the third flange 86 may not be disposed perpendicular to the second flange 84. As such, the third flange 86 may extend at an angle, such as an acute angle with respect to the second flange 84. In the embodiment shown in FIG. 2, the third flange 86 is disposed opposite and spaced apart from the first flange 82. In addition, the first and third flanges 82, 86 may terminate before extending to the camshaft housing hole 94. As such, the camshaft housing hole 94 may not be disposed between the first and third flanges 82, 86.

Figure 3:
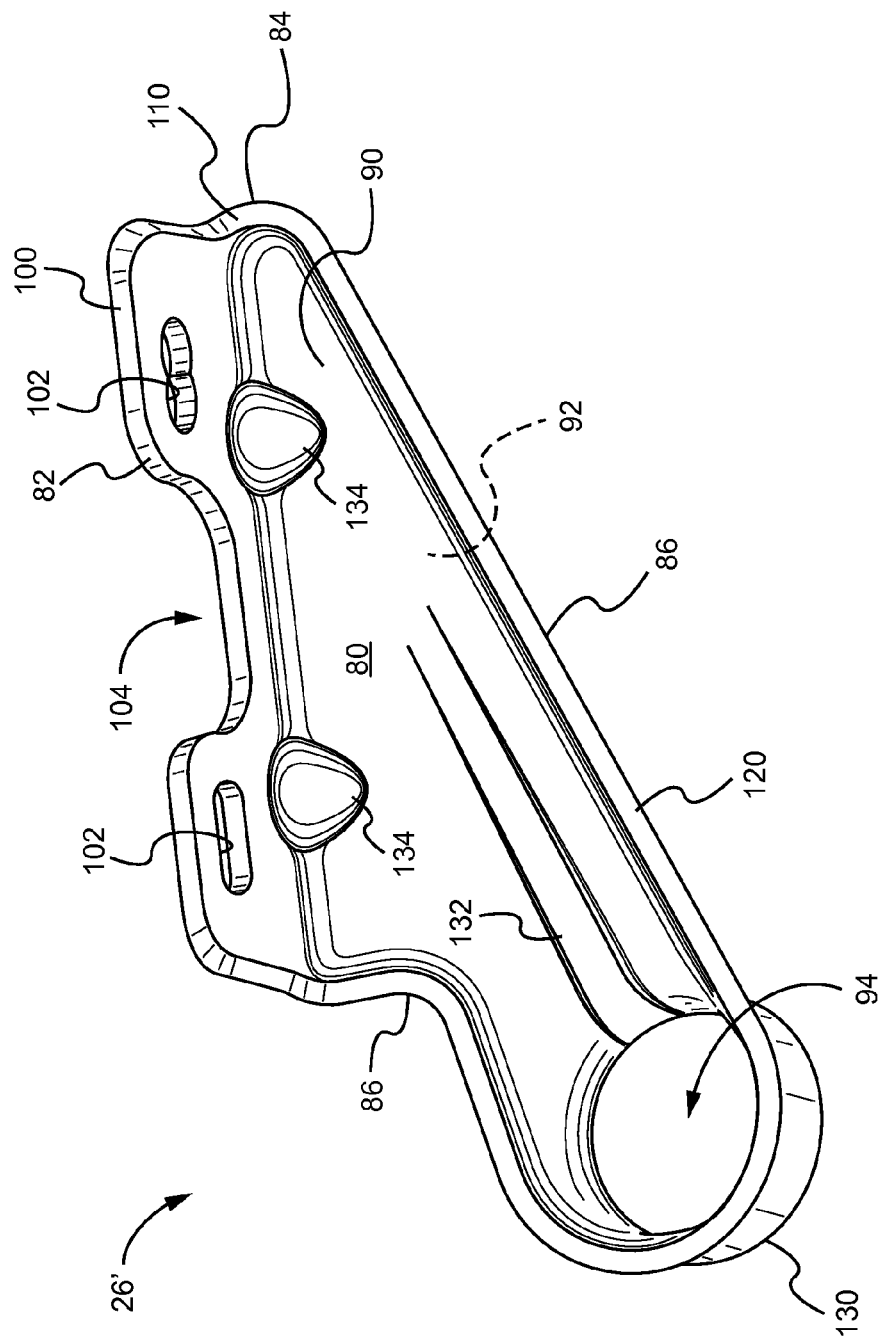
FIG. 3 is a perspective view of another embodiment of a brake wing.

Referring to FIG. 3, another embodiment of a brake wing 26' is shown. In this embodiment, the panel 80 may include a tubular portion 130, a first reinforcement feature 132, and a second reinforcement feature 134.

The tubular portion 130 may extend around the camshaft housing hole 94 and may be radially disposed with respect to the axis 76. The tubular portion 130 may receive and engage the camshaft housing 24 and may extend from the second surface 92 toward the spider 20, or away from the first surface 90.

The first reinforcement feature 132 may be configured as an indentation in the first surface 90 and may protrude from the second surface 92. In addition, the first reinforcement feature 132 may extend from the camshaft housing hole 94 and/or tubular portion 130 toward the second flange 84. Moreover, the first reinforcement feature 132 may extend substantially parallel to a portion of the third flange 86 that may be disposed opposite the first flange 82. The first reinforcement feature 132 may help reinforce or support the tubular portion 130 to inhibit deflection or deformation. In addition, the first reinforcement feature 132 may be disposed between and may be spaced apart from the first, second, and third flanges 82, 84, 86.

The second reinforcement feature 134, if provided, may be extend between the panel 80 and the first flange 82. The second reinforcement feature 134 may be configured as a dart that may protrude from the first surface 90 and that may extend into the second surface 92. In the embodiment shown in FIG. 3, two second reinforcement features 134 are shown that are spaced apart from each other and disposed on opposite sides of the actuator shaft opening 104.

The third flange 86 may extend from the first flange 82 to the second flange 84. More specifically, the third flange 86 may extend from an end of the second flange 84 and around the camshaft housing hole 94 to the first flange 82. The third flange 86 may extend along a curve or arc when extending around the camshaft housing hole 94. As such, the first, second, and third flanges 82, 84, 86 may extend from the first surface 90 and surround the panel 80. In addition, the second and third flange end surfaces 110, 120 may be disposed closer to the first surface 90 than the first flange end surface 100. In FIG. 3, the second and third flange end surfaces 110, 120 are aligned with each other and disposed the same distance from the first surface 90.

Referring to FIG. 1, the camshaft 28 may be configured to actuate the brake pad assemblies 22. The camshaft 28 may extend along and may rotate about the axis 76. The camshaft 28 may extend through the tube portion 72 of the camshaft housing 24 and through the hole 74 in the spider 20. The camshaft 28 may include a cam disposed at a first end. The cam may be an S-cam and may be configured to engage the cam roller on the brake shoe 60. Rotation of the camshaft 28 may actuate the brake pad assemblies 22 such that the friction material 62 moves toward or engages an inner surface of the brake drum to brake or slow or inhibit rotation of an associated wheel assembly. The camshaft 28 may also include a second end that is disposed opposite the first end. The second end of the camshaft 28 may engage the slack adjuster 30.

The slack adjuster 30 may be provided to compensate for brake wear or wear of the friction material 62. The slack adjuster 30 may be fixedly disposed near the second end of the camshaft 28. For example, the slack adjuster 30 may have a mounting hole 140 that receives the camshaft 28. In at least one embodiment, the mounting hole 140 of the slack adjuster 30 and the camshaft 28 may have mating splines that may help couple the slack adjuster 30 and a camshaft 28 together.

The actuator 32 may be provided to actuate the camshaft 28. The actuator 32 may be of any suitable type, such as a pneumatic, hydraulic, electrical, or electromechanical actuator. The actuator 32 may include an actuator shaft 150 that may extend to or toward the slack adjuster 30. The actuator 32 may move between a retracted position and an extended position. In the retracted position, the camshaft 28 may be positioned such that a brake pad assembly 22 does not engage the brake drum to brake or inhibit rotation of an associated vehicle wheel assembly. In the extended position, the actuator 32 may rotate the camshaft 28 and actuate the brake pad assemblies 22 to move toward and engage the brake drum to inhibit rotation of an associated wheel hub assembly. The actuator 32 may be fixedly mounted to the brake wing 26. For example, the actuator 32 may be mounted to the first flange 82 of the brake wing 26. The actuator 32 may include one or more mounting features 152, such as a threaded mounting stud that may extend through a mounting hole 102 in the brake wing 26 and that may receive a washer and nut to fixedly couple the actuator 32 to the brake wing 26.

The brake assembly and brake wings described above may resist deflection during operation of the actuator 32, which may provide improved desired brake performance. In addition, a lighter weight brake assembly or brake wing may be provided due to the elimination of gussets or other reinforcement features that may be assembled to a brake wing or other brake assembly components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a camshaft housing configured to receive a camshaft for actuating a brake pad assembly; and
   a brake wing that includes:
      a panel having a first surface, a second surface, and a camshaft housing hole that extends from the first surface to the second surface, wherein the camshaft housing hole receives the camshaft housing;
      a first flange that extends from the panel and has a pair of mounting holes;
      a second flange that extends from the panel and from the first flange such that the second flange is not coplanar with the first flange; and
      a third flange that extends from the panel and at an angle from the second flange such that the first flange and the second flange are not coplanar with the third flange;
   wherein the first, second, and third flanges extend in a direction that faces away from the second surface and the second flange extends from the first flange to the third flange.

2. The brake assembly of claim 1 wherein the first flange is disposed substantially perpendicular to the second flange.

3. The brake assembly of claim 1 wherein the first flange, the second flange, and the third flange extend from the first surface.

4. The brake assembly of claim 3 wherein the first and third flanges extend from opposite ends of the second flange.

5. The brake assembly of claim 3 wherein the first and second flanges extend further from the first surface than the third flange.

6. The brake assembly of claim 3 wherein the first flange is spaced apart from the third flange.

7. The brake assembly of claim 3 wherein the first flange is disposed opposite the third flange.

8. The brake assembly of claim 3 wherein the first, second, and third flanges are disposed at ends of the panel.

9. The brake assembly of claim 3 wherein the first, second, and third flanges extend substantially perpendicular to the panel.

10. The brake assembly of claim 9 wherein the third flange does not engage the first flange and is completely disposed below the first flange.

11. The brake assembly of claim 3 wherein the camshaft housing hole is not disposed between the first and third flanges.

12. The brake assembly of claim 3 wherein the first flange includes a first flange end surface and the second flange includes a second flange end surface and a second flange ramp surface, wherein the second flange end surface extends from the first flange end surface to the second flange ramp surface and the second flange ramp surface extends from the second flange end surface to the third flange.

13. A brake assembly comprising:
   a camshaft housing configured to receive a camshaft for actuating a brake pad assembly; and
   a brake wing that includes:
      a panel having a first surface, a second surface, and a camshaft housing hole that is configured to receive the camshaft housing and the camshaft;
      a first flange that extends from the panel, wherein the first flange is configured to support an actuator for actuating the camshaft;
      a second flange that extends from the panel and the first flange; and
      a third flange that extends from the panel and extends from the second flange to the first flange;
   wherein the first, second, and third flanges extend substantially perpendicular to the panel.

14. The brake assembly of claim 13 further comprising a tubular portion that extends around the camshaft housing hole and that extends from the second surface.

15. The brake assembly of claim 14 further comprising a first reinforcement feature that extends from the camshaft housing hole and from the tubular portion, wherein the first reinforcement feature protrudes from the second surface.

16. The brake assembly of claim 15 wherein the first reinforcement feature is disposed between and is spaced apart from the first, second, and third flanges.

17. The brake assembly of claim 15 wherein the third flange extends around the camshaft housing hole and extends from the second flange to the first flange.

18. The brake assembly of claim 15 wherein the first reinforcement feature extends toward the second flange and extends substantially parallel to a portion of the third flange disposed opposite the first flange.

19. The brake assembly of claim 13 further comprising a second reinforcement feature that extends between the panel and the first flange, wherein the second reinforcement feature protrudes from the first surface.

20. The brake assembly of claim 13 wherein the first, second, and third flanges extend from the first surface of the panel.

* * * * *